Figure 4:
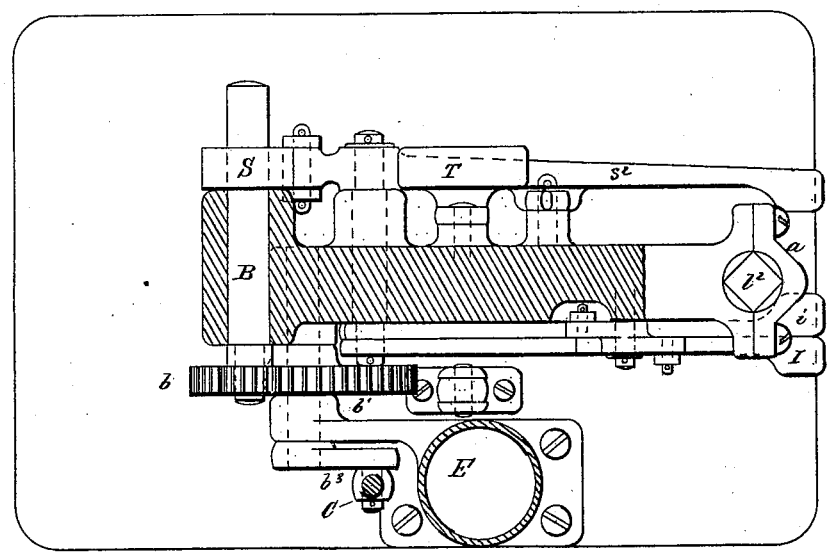

6 Sheets--Sheet 1.
G. McKAY, H. P. FAIRFIELD & C. W. GLIDDEN.
Machine for Attaching and Trimming Heels.
No. 166,795. Patented Aug. 17, 1875.
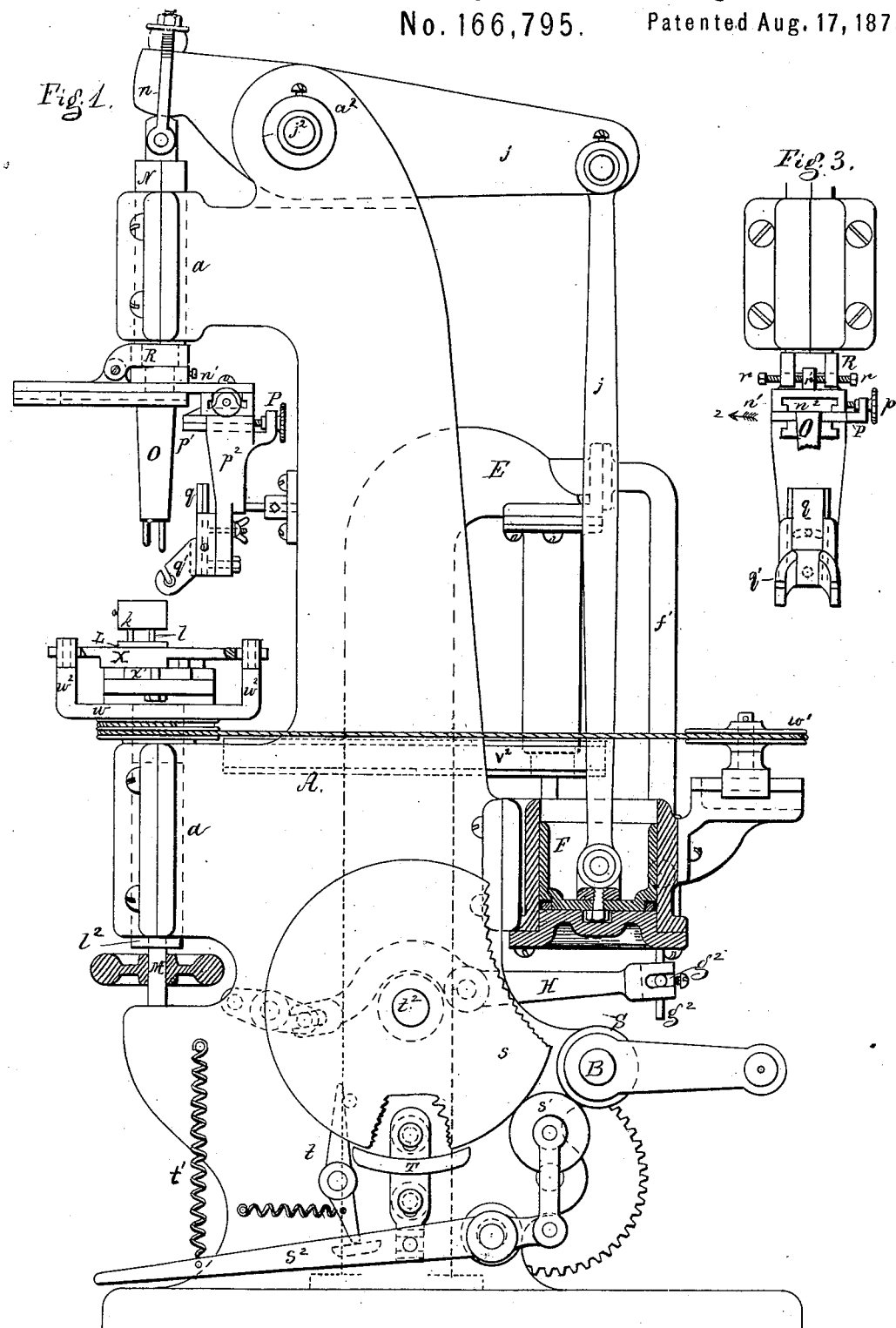
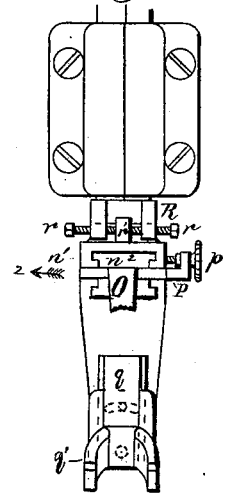
Witnesses.
L. H. Latimer.
W. J. Pratt.
Inventors.
Gordon McKay, Hadley P. Fairfield
and Charles W. Glidden
per Crosby & Gregory Attys.

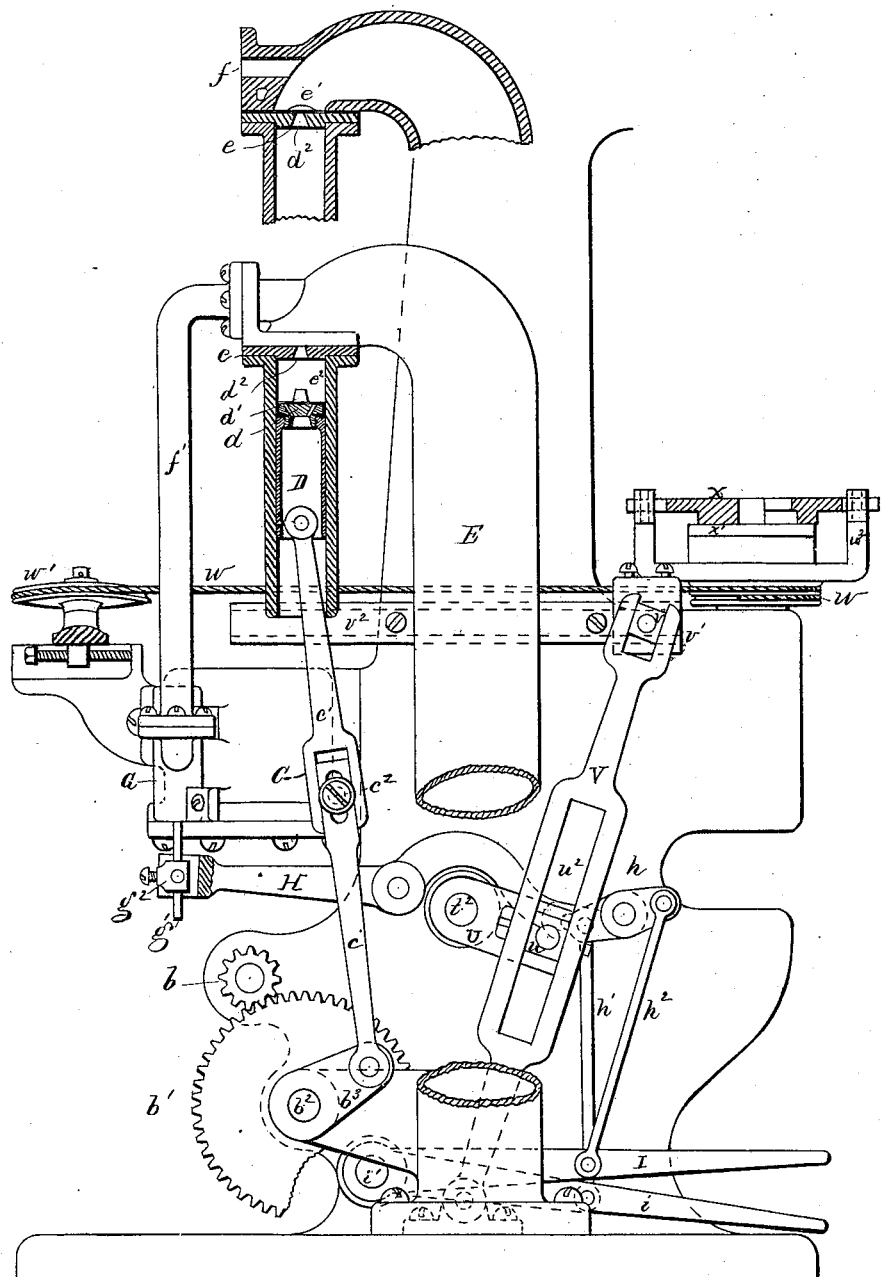

6 Sheets--Sheet 3.

G. McKAY, H. P. FAIRFIELD & C. W. GLIDDEN.
Machine for Attaching and Trimming Heels.

No. 166,795. Patented Aug. 17, 1875.

Witnesses.
L. H. Latimer.
W. J. Pratt.

Inventors
Gordon McKay, Hadley P Fairfield
and Charles W. Glidden
PER Crosby Gregory
Att'ys

N. PETERS, PHOTO-LITHOGRAPHER, WASHINGTON, D. C.

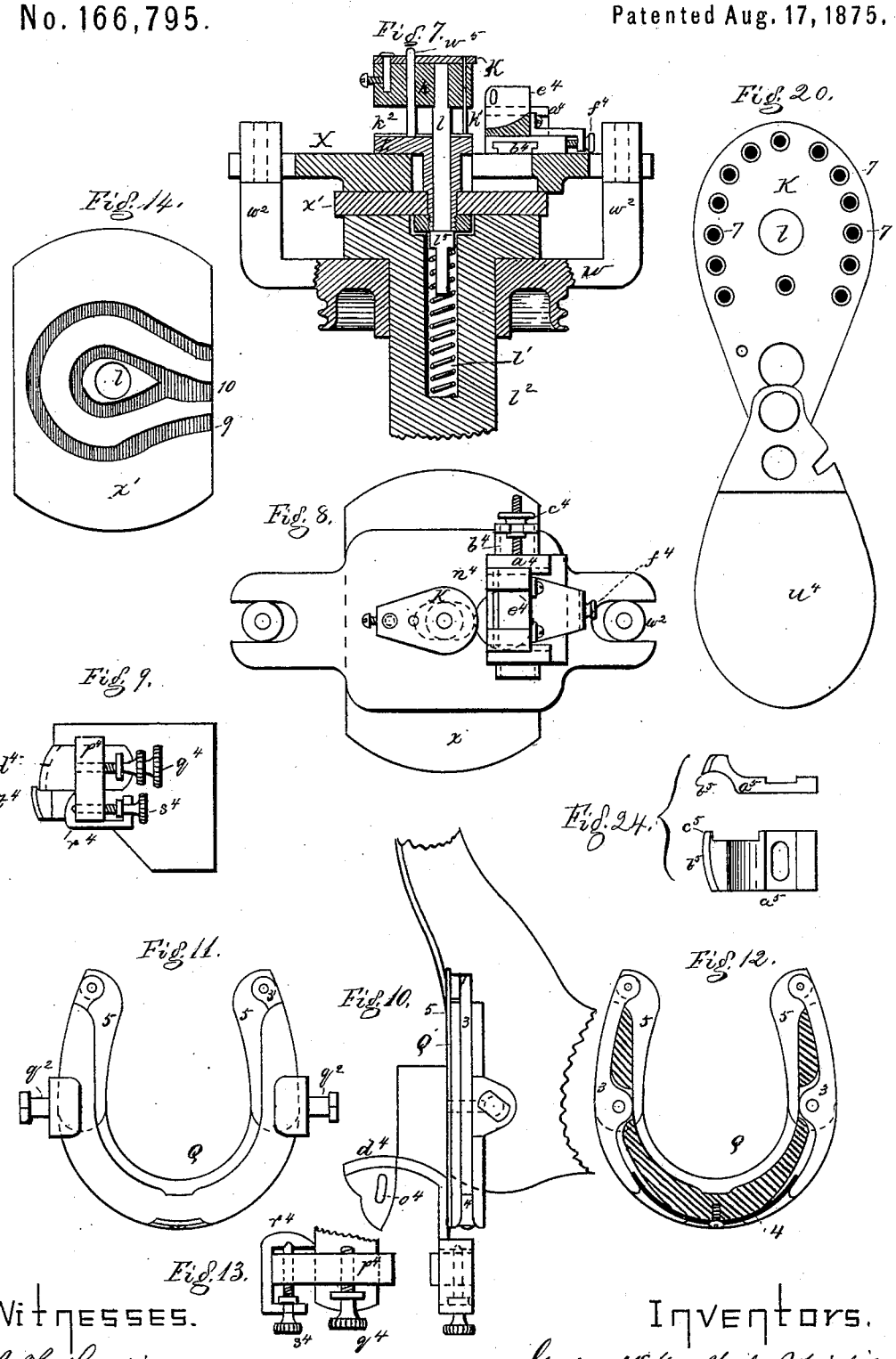

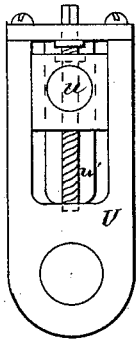
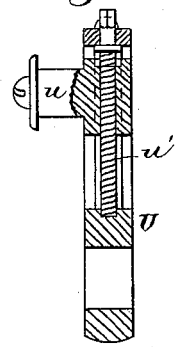
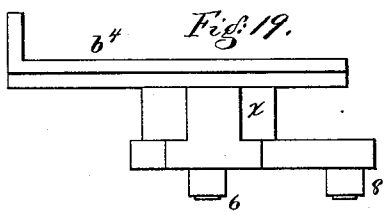
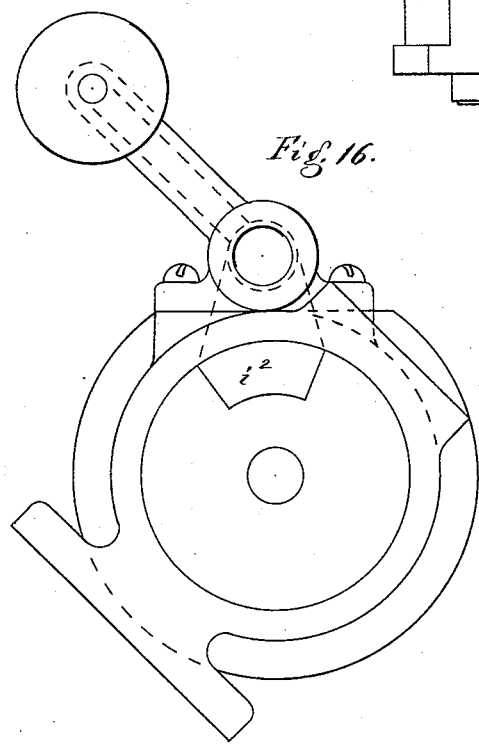
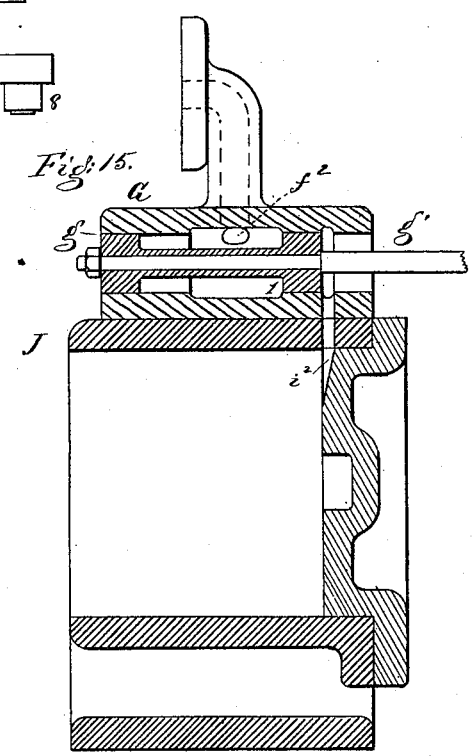

6 Sheets--Sheet 6.
G. McKAY, H. P. FAIRFIELD & C. W. GLIDDEN.
Machine for Attaching and Trimming Heels.
No. 166,795. Patented Aug. 17, 1875.
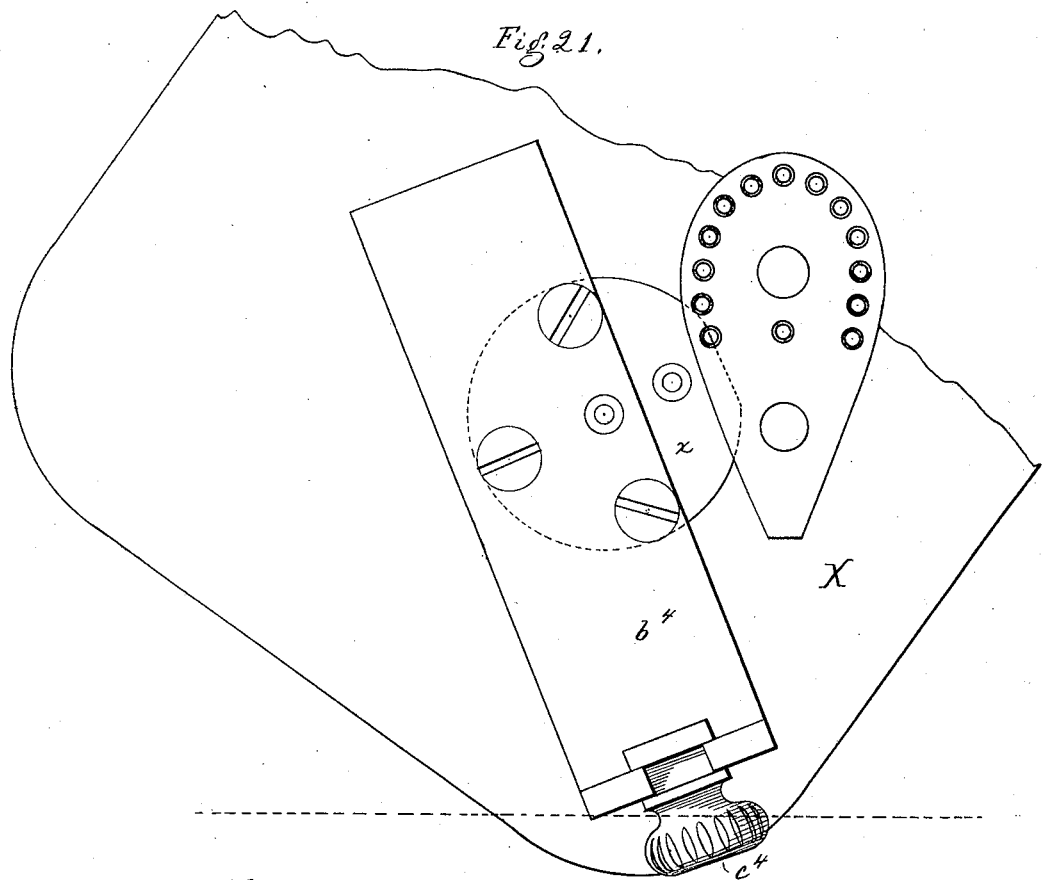
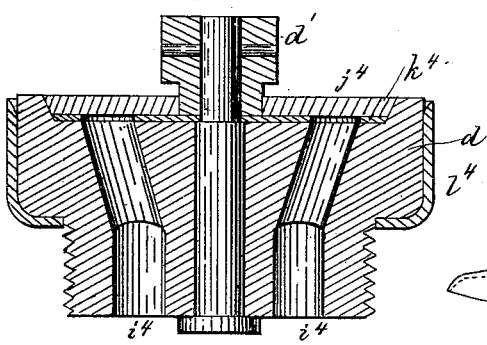
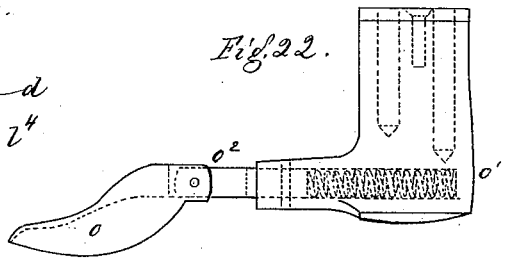
Witnesses.
L. H. Latimer.
W. J. Pratt.
Inventors.
Gordon McKay, Hadley P. Fairfield
and Charles W. Glidden
per. Crosby & Gregory Attys.
N. PETERS, PHOTO-LITHOGRAPHER, WASHINGTON, D. C.

UNITED STATES PATENT OFFICE.

GORDON McKAY, OF CAMBRIDGE, HADLEY P. FAIRFIELD, OF BOSTON, AND CHARLES W. GLIDDEN, OF LYNN, ASSIGNORS TO JAMES W. BROOKS, TRUSTEE, OF BOSTON, MASSACHUSETTS.

IMPROVEMENT IN MACHINES FOR ATTACHING AND TRIMMING HEELS.

Specification forming part of Letters Patent No. 166,795, dated August 17, 1875; application filed June 24, 1875.

*To all whom it may concern:*

Be it known that we, GORDON McKAY, of Cambridge, Middlesex county, CHARLES W. GLIDDEN, of Lynn, Essex county, and HADLEY P. FAIRFIELD, of Boston, Suffolk county, all in the State of Massachusetts, have invented an Improved Machine for Attaching and Trimming Heels, of which the following is a specification:

This invention relates to a machine for attaching heels to boots and shoes, and for trimming and fashioning the heels after they are attached; but either mechanism may be used separately.

In this mechanism the shoe to which the heel is to be attached is placed upon a last connected with a carrying-bar, having a plate adapted to slide in or on a jack-holding plate, which also carries and permits the adjustment of the heel-seat clamp to correspond with heels of different sizes. The jack-holding plate is carried by a reciprocating bar connected with a walking-beam operated by compressed air, acting through a cylinder, piston, and link. The heel to be attached to the shoe or boot, and composed of layers of leather or of other material, has a series of nails projecting from its lower side, and these nails are entered in the series of holes in the heel-supporting plate, provided with a series of nail-drivers, which meet the ends of the nails as the heel-support is depressed by the action of the shoe-sole on the heel, the sole and shoe being depressed through the action of the walking-beam. The nails, by this movement, are driven through the heel into and through the sole, and clinched by striking against the bottom of the last, and at a single operation. After the nails are driven the heel cutting or trimming mechanism is thrown into action. The heel-trimming knife is guided about the heel-support in a heel-shaped path, being governed by cam-grooves in a plate, into which project pins from a turn-table. The trimming-knife holder is carried by this turn-table, it in turn being carried by, and is free to rotate in, a rotary reciprocating carriage having movement imparted to it by means of projections on a cross-plate, which enter openings in the carriage, the cross-plate being supported on a spindle moved by a band or cord attached to a sliding carriage operated by a slotted radius-bar through a crank on a rotating shaft. The knife is supported on the trimming-knife holder and in a slide, so that the cutting-edge of the knife may always be kept on a line with the center, about which the turn-table turns, so as to properly and smoothly cut the heel.

Figure 5:
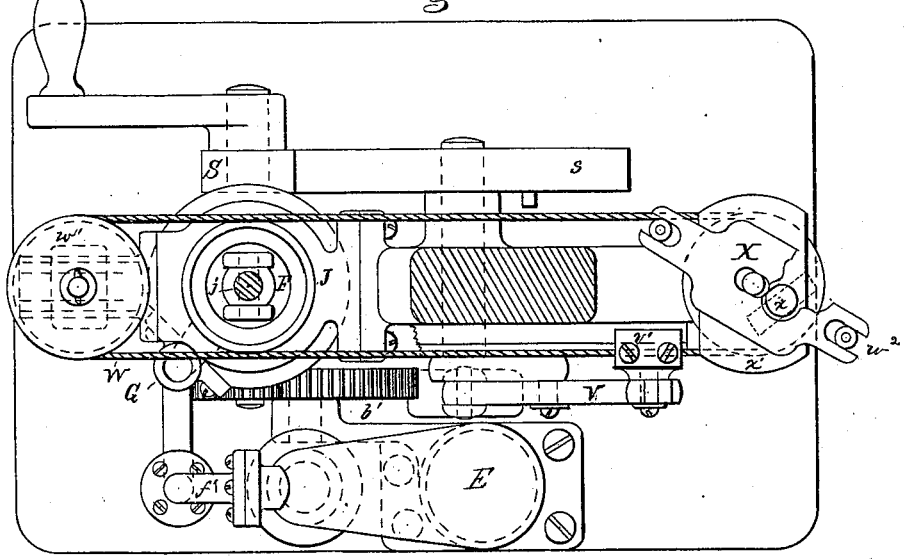
Figure 6:

Figure 1 represents a side elevation of a machine embodying this invention, the cylinder being in section. Fig. 2 is an opposite side view of part of the machine, with the air-compressing apparatus in section, the compressed air-receiver being broken away, and with a detached part of the receiver shown in section above the figure. Fig. 3 represents the holding and adjusting devices for the clamp. Fig. 4 is a partial section across the lower part of Fig. 1. Fig. 5 is a top view of Fig. 1, with the upper part of the frame of the machine and the walking-lever and last and its support removed or broken away. Fig. 6 represents the lever for operating the valve mechanism leading to the cylinder. Fig. 7 is a partial section through the heel-support, and devices for operating the heel-trimming mechanism. Fig. 8 is a top view of parts shown in Fig. 7. Fig. 9 is a view of the heel-trimming knife removed from the knife-holder. Fig. 10 is a view in part of a shoe or boot with the clamp in position and the knife $d^4$ acting to trim the heel. Figs. 11 and 12 are views of the clamp; Fig. 13, partial view of the knife; Fig. 14, a view of the grooved plate; Figs. 15 and 16, views of the cylinder and valve mechanism for operating the walking-beam; Figs. 17 and 18, views of the crank and its adjustable pin; Fig. 19, a side view of the turn-table; Fig. 20, a top view of the heel-support $k$; Fig. 21, a top view of the turn-table for carrying the trimming-knife about the heel-support; Fig. 22, a view of the last, and Fig. 23 the valve of the air-compressor.

A is the frame of the machine, having projecting portions $a$ $a^1$, forming guides and bearings, and properly shaped to support the working parts of the machine. Power is applied to the main shaft B of the machine, through a handle or pulley, in any well-known way, a pinion, $b$, thereon engaging a pinion, $b^1$, on a second shaft, $b^2$, having a crank, $b^3$, connected by link C (preferably in two parts, $c\ c^1$, joined by a screw $c^2$) with the plunger or piston D of the air-compressing pump, adapted to supply the receiver E with compressed air. This piston consists of a head or seat, $d$, screwed into the cylindrical portion of the piston, and has a valve provided with a series of holes, $i^4$, Fig. 23, and a plate, $j^4$, seated at the top of head $d$, yet being free to rise and fall about a central guide or plug, $d^1$, which is adapted to fit a correspondingly-shaped opening, $d^2$, in a support, $e$, for the valve $e^1$. A leather or other washer, $k^4$, perforated with holes, rests under plate $j^4$, and a cup-like packing, $l^4$, surrounds $d$. When the piston descends, the valve $e^1$ closes, opening $d^2$, and plate $j^4$ rises a little from its seat, permitting air to pass through openings $i^4$ above $d$, and into the chamber $e^2$. As the piston rises, the plate $j^4$ is held to its seat, valve $e^1$ rises, the air in the chamber $e^2$ is compressed or forced into the receiver E, and the plug $d^1$, acting within the opening $e$, forces all the air within the chamber $e^2$ into the chamber or receiver E. The piston F, for imparting motion to the parts carrying the boot or shoe to be heeled, is moved upward by the action of the compressed air of the receiver, such compressed air being conducted through an opening, $f$, into a pipe, $f^1$, which, by suitable elbows or connections, delivers it at opening $f^2$ into the valve-chest G, provided with a double-headed valve, $g$, carried by a spindle, $g^1$, having an attached yet adjustable block, $g^2$, engaged by the forked end of the pivoted lever H, for operating the valve-rod $g^1$, and slotted at its other end to receive a pin projecting from a pivoted lever, $h$, connected by links $h^1$ $h^2$ with treadles or levers I $i$, pivoted at $i^1$. A passage, $i^2$, leads from valve-chamber G into the cylinder J, and under the piston F. With the valve $g$ in the position shown in Fig. 15, the passage $i^2$ is free to communicate with the atmosphere, and the weight of the piston F and walking-beam is such that the piston will descend or remain at the bottom of the cylinder J. Now, if the lever I is depressed, lever H and the valve-rod $g^1$ will be depressed thereby, bringing the face 1 of the valve $g$ below the passage $i^2$, and then the compressed air will enter from the pipe $f^1$ of the receiver, through the valve-chest and under, and will quickly raise the piston F, which, through its attached link $j$, moves the walking-beam $j^1$, having its fulcrum $j^2$ resting in bearings at $a^2$. The heel support or plate K has a series of holes, 7 7, to receive the nails partially entered or started into the lower portion of the heel to be attached to a shoe, but projecting from the heel, and the box $k$, on which the plate rests and is pivoted, contains within it a series of drivers, $k^1$, resting on a loose plate, $k^2$, supported on a stationary heel-shaped plate, L, shaped to conform to the shape of the heel-support and box K $k$. The box and supporting-plate $k$ are sustained on a rod, $l$, which passes through plate L, and is sustained on a shouldered pin, $l^5$, resting on a spiral spring, $l^1$, sustained in a chamber of a post, $l^2$, which may be raised and lowered in its bearing at $a$ by means of a screw, M, seated at one end on the frame A, and provided with screw-threads to engage screw-threads in an opening in the post $l^2$. By the hand-wheel on the screw the post may be raised or lowered to adapt the mechanism to operate on heels of different thicknesses.

This construction of the heel-support, box, loose plate, and rod $l$ enables the heel-support to be easily and quickly removed from the turn-table to permit the application of another support and box and drivers adapted for different-sized heels, and in doing so the loose plate $k^2$ retains the drivers in position, and prevents them from being thrown out of the box $k$; but this feature, as well as the provision for adjusting the trimming-knife, we do not herein claim, as they form the subject-matter of an application for patent made by Charles Woodbury Glidden and Stephen Allen Simmons.

Supposing the nails projecting from a heel, as described, and inserted in the holes in the plate K, then the descent of the heel and box $k$, the heel being kept in contact with the plate K, and the drivers $k^1$ being then immovable, will cause the drivers to act on the ends of and drive the nails in and through the heel, and into and through the sole of the shoe, provided the sole is kept in contact with the heel as the latter descends, and the nails striking against the metallic last will be clinched.

The mechanism for depressing the shoe and keeping its sole in contact with the heel while the heel is depressed, and the nails are driven through the heel into the sole, may be described as follows: The bar N, guided in projection $a$ of the frame, and made angular or otherwise to prevent rotation, is connected, by means of a stirrup, $n$, with the end of, and is reciprocated by, the walking-beam. To the lower end of bar N is adjustably attached a jack-holding plate, $n^1$, grooved to receive the flanged plate $n^2$ of the bar O, which carries the last or shoe-holder, (see Fig. 22,) having an adjustable toe-piece, $o$, and a heel part, $o^1$, provided with sockets to receive the pins projecting from the last-carrying bar O. The toe-piece is pressed forward by a spring surrounding its carrying-rod $o^2$. Attached to plate $n^1$ is a T-shaped guiding-ledge, embraced by a correspondingly shaped slide, P, adjustable by means of a screw, $p$, in the direction of the arrow 2, Fig. 3. On the under side of this slide is a T-shaped ledge, $p^1$, crossing it at right angles, and this ledge is embraced by the correspondingly-shaped upper end of the arm $p^2$, having at its lower end a guide-box receiving the guide-plate $q$, having the forked slotted-eyed support $q^1$ of the heel-seat clamp Q, provided with ears $q^2$, entering the slotted eyes in the support $q^1$, the clamp being in this way supported and adjustable in position, to allow the position of the clamp, which is of a size to conform to the size of shoe being heeled, to be adjusted to present the sole at the heel part exactly in the proper position with relation to the heel, so as to properly attach the heel.

In boots or shoes made up rights or lefts it is necessary to have what is called a right and left adjustment of the shoe or boot with relation to the heel, and for this purpose a forked piece, R, is attached to the bar N, and is provided with two set-screws, $r$, to bear on a projection, $r^1$, from plate $n^1$, and by turning these screws the plate may be turned to the right or left, so as to set the heel correctly. For this class of work the toe should be inclined toward that side of the shoe hollowed to fit the inside of the foot.

The clamp Q for the shoe is carried by the arm $p^2$, connected with the jack-holding plate $n^1$, and the clamp is therefore moved when the plate $n^1$ is adjusted. If the arm $p^2$ were not so connected with the plate $n^1$, then the clamp would bind the heel-seat unevenly under different adjustments of the plate $n^1$. The clamp Q has hinged wings or levers 3 3, thrown inward by a spring, 4, and the clamp and wings have thin plates 5, adapted to enter between the sole and bent portion of the counter, the wings and their plates hugging the heel-seat closely.

In Fig. 10 the clamp is shown as applied to a shoe, the heel has been attached, and the heel-trimming knife $d^4$ is shown as in position, and as having cut a portion of the heel.

The driving-shaft B has a friction-wheel, S, and near it, on another shaft, is a friction-pulley, $s$, which is moved, when desired, by bringing between the two pulleys a third pulley, $s^1$, worked by a treadle, $s^2$. When the pulley $s^1$ is not in contact with the other pulleys its treadle is raised, and the brake T holds the wheel $s$ in fixed position. This wheel is intended to rotate once, and then to have an interval of rest, so when the lever $s^2$ is depressed to engage the wheels a lever, $t$, is thrown in position, as shown in Fig. 1, bearing on a lug on lever $s^2$, and holding that lever down, and the wheels remain so engaged until a pin on wheel $s$ (shown in dotted lines, Fig. 1) strikes the lever $t$, when the lever is turned, and the treadle is allowed to rise under the action of its attached spring $t^1$. The shaft $t^2$ of wheel $s$ has a crank, U, provided with a crank-pin, $u$, adjustable by a screw, $u^1$, entering a slot, $u^2$, in a slotted radius-bar, V, forked at top, and fitted to a pivoted block, $v$, on a carriage, $v^1$, arranged to run on a guide-way, $v^2$. One rotation of the crank gives one complete vibration to the radius-bar, its extent of movement depending on the position of the crank-pin $u$, and one such vibration through cords W, connected with a pulley on the forked cross-plate $w$, and passing about an adjustable pulley, $w^1$, on a movable standard, turns the cross-plate around the heel-support and back, this being the movement required to trim the heel and return the trimming-knife to its starting position. This movement takes place after the heel is attached, and while the shoe and heel are held down. From the cross-plate $w$ project lugs $w^2$, which enter slots in a movable carriage, X, provided with a turn-table, $x$, having pins 6 8, Fig. 19, entering grooves 9 10, Fig. 14, in a stationary plate, $x'$. These grooves are shaped substantially as shown in Fig. 14, the groove 9 receiving the pin 6, and the groove 10 the pin 8. The groove 10 governs the shape of the heel, and the groove 9 controls the presentation of the knife to the heel, so that the angle at which it meets the leather on its travel about the heel shall be such as to cut with the greatest ease and advantage possible, and therefore the outer groove is made of a shape differing somewhat from groove 10, and is adapted, in each case, to the particular shape of the heel to be trimmed.

The trimming-knife holder $a^4$ is adapted to slide on a T-shaped ledge, $b^4$, attached to the turn-table $x$, and the holder is adjustable by means of a nut, $c^4$, engaging a screw projecting from the holder. This nut and screw permit the adjustment of the edge of the knife $d^4$, so that it shall be exactly in line with the center on which the turn-table turns, so that the cut shall always be smooth and not injuriously dip into or leave the leather, or cut the heel roughly. The knife $d^4$, curved to properly shape the heel, is adjustable laterally in its holder $a^4$, to adapt it to heels of different sizes, it being carried by a slide-plate, $e^4$, adjusted by a screw and nut, $f^4$. The plate $e^4$ has a rod, $n^4$, fitted to its ears, and this rod is entered in the opening $o^4$ in a lug attached to the lower end of the knife, this rod serving as a fulcrum for the knife. The knife $d^4$ is made adjustable with reference to a block, $p^4$, Fig. 9, and to the sole-gage, $t^4$, by means of a screw, $q^4$, to regulate the depth of the cut or the quantity of material to be removed from the sole and heel. This block $p^4$ carries a gage, $r^4$, adjustable by means of a set-screw, $s^4$, the gage being adjusted to strike the end of the clamp Q, and throw the upper end of the knife outward just as the knife is finishing its cut, to prevent the knife from cutting the shank of the sole. The sole-gage is shown by the letter $t^4$, Fig. 9; it bears against the edge of the sole as the trimming-knife is moved about the heel. In Fig. 20 the heel-support is shown of full size for one class of heels. Hinged or pivoted to plate K is a plain plate, $u^4$. The nails are usually not driven quite through the outer lift of the heel, because an outside or finishing lift is added. To add the finishing lift turn the plate $u^4$ over the plate K, place the outside lift on it, and then force the lift, by the descent of the heel and shoe, onto the projecting heads of the heel-nails. In Fig. 21 the turn-table and knife-carrying guide $b^4$ are in the position they occupy with reference to the heel-support, just about as the knife commences to cut the heel, and as the plate X is rotated half-way round the pins 6 8 of the turn-table, entering the grooves 9 10 of the plate $x'$, cause the carrier-guide to so move as to move the knife in a heel-shaped path, and present its edge in the proper angular position to cut the heel of the desired shape. The clamp Q is used chiefly in the manufacture of shoes having cloth uppers, and it may be used with advantage with all kinds of shoes; but in the manufacture of shoes having leather counters it need not be used. In such case the shoe is put over the last, as before described, and, instead of the sole-gage $t^4$, the rand-crease gage and guard $u^5$, Fig. 24, is placed in advance of the trimming-knife, its edge $b^5$ resting in the rand-crease, and its lip $c^5$ overlapping the upper corner of the knife, preventing it from cutting the counter.

Rising from the stationary plate L is a pin, $w^5$, which, in connection with rod $l$, keeps the heel-support and box in correct position. In addition to its function of a guide, this pin also serves as a locking device for the plate $n^4$, its upper end entering the opening $a^6$ in the plate, thereby holding it in position on top of the support K, so that it is in correct position with reference to the knife which turns the heel after the top lift is added.

We claim—

1. The walking-beam and its connecting-rod and piston, adapted to be operated by compressed air, in combination with the bar N and last-carrying bar, substantially as described.

2. The jack-holding plate $n^1$ and the support for the heel-seat clamp, connected together through arm $p^2$, and together adjustable, substantially as and for the purpose described.

3. The bar N, in combination with the jack-holding plate $n^1$, adjustable on the bar, substantially as described, to adapt the jack to right and left shoes, as set forth.

4. The heel-seat clamp Q, provided with hinged wings or levers 3, a spring, and plates 5, constructed and operating substantially as and for the purpose described.

5. The heel-seat clamp Q, provided with ears $q^2$, in combination with the adjustable slotted-eyed support $q^1$, and arm $p^2$, and jack-holding plate $n^1$, substantially as and for the purpose described.

6. In a heeling-machine, the walking-beam $j^1$, link $n$, and bar N, in combination with the jack-bar and heel-seat clamp, connected with and carried by the bar, substantially as described.

7. In a machine for attaching heels, the plunger D of the air-compressing apparatus, provided with the perforated head $d$, movable plate, and plug, in combination with the support $e$, having opening $d^2$ to receive the plug, and with valve to retain the compressed air in the cylinder, substantially as and for the purpose described.

8. In a machine for attaching heels, the compressed air-receiver E, its connected pipe $f^1$, and the valve-chest G, in combination with the piston F, its link $j$, walking-beam bar N, and last-carrying bar, substantially as and for the purpose described.

9. In a heeling-machine, the crank $b^3$, adjustable two-part link C, and plunger D of the air-pump, substantially as and for the purpose described.

10. The combination of the valve-chest, valve, and valve-rod of a heeling-machine with the levers H $h$, and treadles for operating the levers, substantially as described.

11. The pivoted vibrating-radius bar, crank, and adjustable connection between the crank and radius-bar, in combination with the sliding carriage and cord for operating the heel-trimming mechanism, substantially as and for the purpose described.

12. The plate X, adapted to carry a heel-trimming mechanism, in combination with the forked cross-plate, provided with lugs $w^2$ $w^2$, substantially as and for the purpose set forth.

In testimony whereof we have signed our names to this specification in the presence of two subscribing witnesses.

GORDON McKAY.
 HADLEY P. FAIRFIELD.
 CHARLES W. GLIDDEN.

Witnesses:
 EDWIN STANLEY,
 WILLIAM E. FREEMAN.